United States Patent [19]

Hajzler

[11] Patent Number: 4,968,156
[45] Date of Patent: Nov. 6, 1990

[54] BEARING WITH A MAGNETIC FIELD SENSOR

[75] Inventor: Christian Hajzler, Annecy, France

[73] Assignee: The Torrington Company, Torrington, Conn.

[21] Appl. No.: 441,738

[22] Filed: Nov. 27, 1989

[51] Int. Cl.$^5$ .............................................. F16C 32/00
[52] U.S. Cl. ....................................... 384/448; 384/477
[58] Field of Search ............... 384/446, 448, 477, 624, 384/627; 310/168, 155

[56] References Cited

U.S. PATENT DOCUMENTS

| | | | |
|---|---|---|---|
| 3,500,091 | 3/1970 | Jones | 310/168 |
| 4,555,685 | 11/1985 | Maruyama | 310/168 X |
| 4,688,951 | 8/1987 | Guers | 384/448 X |
| 4,732,494 | 3/1988 | Guers et al. | 384/446 X |
| 4,850,722 | 7/1989 | Bayer | 384/448 |

FOREIGN PATENT DOCUMENTS

| | | | |
|---|---|---|---|
| 323789 | 7/1989 | European Pat. Off. | 384/477 |
| 2756930 | 7/1978 | Fed. Rep. of Germany | 310/168 |
| 2574501 | 6/1986 | France | 384/477 |
| 21219 | 1/1989 | Japan | 384/448 |
| 2207470 | 2/1989 | United Kingdom | 384/448 |

Primary Examiner—Thomas R. Hannon
Attorney, Agent, or Firm—F. S. Troidl

[57] ABSTRACT

The bearing has an encorder as a source of a magnetic field and a sensor for detecting the magnetic field. The bearing has a fixed ring and a rotating ring spaced from the fixed ring. A support is mounted on each ring. The encoder is mounted on one support; the sensor is mounted on the other support. A seal is also mounted on one of the supports. The seal is in sealing contact with the other support.

6 Claims, 2 Drawing Sheets

BEARING WITH A MAGNETIC FIELD SENSOR

This invention relates to bearings with magnetic field sensors. More particularly, this invention is a bearing with a magnetic field sensor comprising a fixed ring holding a magnetic field sensor and a rotating ring holding an encoder, rolling elements in contact with said rings, and a seal interposed between these rings.

U.S. Pat. No. 4,732,494 describes a bearing in which the rotating ring has a support surface for mounting the encoder and in which the sensor is integral with a mounting device attached to the fixed ring.

The relative positions of the sensor and encoder generally depends on the machining tolerances of the rings and adjacent parts and cannot be obtained without additional adjustment during the final assembly of the sensor and encoder. In addition, air gap, which is often magnetic, is exposed to contaminants from the outside after assembly.

An object of this invention is a bearing in which the arrangement of the sensor, encoder, and seal eliminates any contamination or loss of adjustment.

According to one aspect of the invention, the sensor and encoder are arranged on supports mounted on the rings of the bearing. A seal is mounted on one support. The seal is in sealing contact with the other support.

According to another aspect of the invention, the sensor and encoder which are attached to the respective bearing rings are shifted axially toward the inside of the bearing in relation to the seal. The sensor, encoder and seal constitute a preassembled unit that can be mounted directly on the bearing properly positioned in relation to the support surfaces of the bearing.

According to another aspect of the invention, the sensor and encoder are shifted radially in relation to the seal to limit the axial space requirement of the bearing.

The invention, as well as its many advantages, may be further understood by reference to the following detailed description and drawings, in which.

Figure 1:
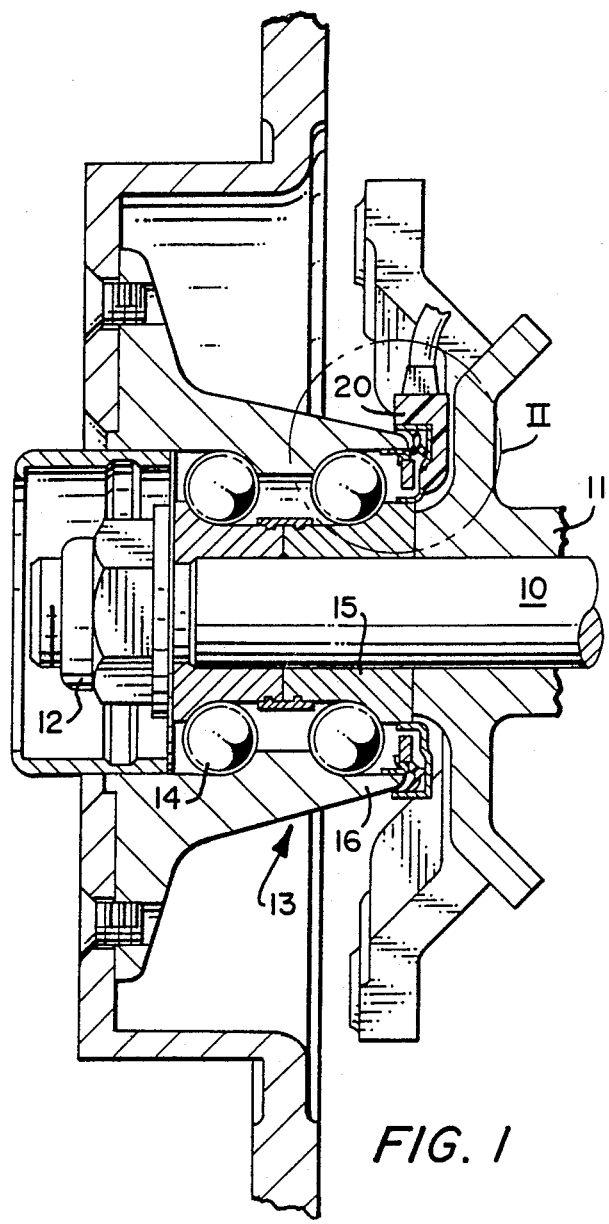
FIG. 1 shows a view in axial cross section of a wheel hub incorporating a bearing with a sensor.
Figure 2:
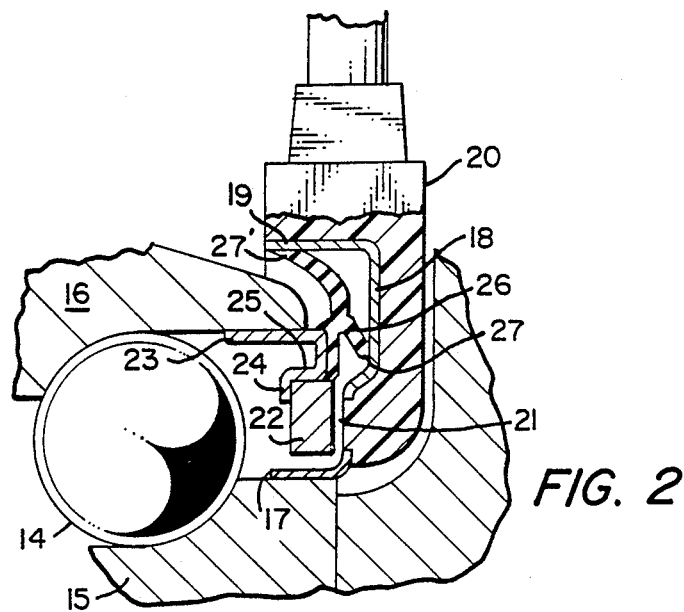
FIG. 2 shows an enlarged view in cross section of detail II of FIG. 1 showing the installation of sensor and encoder and the seal.

A wheel hub includes a journal 10 passing out through a journal holder 11 and having on its threaded end a nut 12 and a washer for transmitting the axial load of a bearing 13 to two rows of rolling elements 14 located between an inner ring 15 which is divided into two sections, and an outer ring 16, which has a radial extension constituting a mounting bracket for a brake disk and the vehicle's wheel.

It should be noted that the bearing could consist of two conventional bearings without in any way going beyond the scope of the invention.

Inner ring 15, which is installed as shown, has an outer support surface, which holds a sensor support 17. Sensor 20 is attached to the radially extending portion 18 and axially extending portion 19 of sensor support 17. Sensor support 17 has an axial opening 21 located in the magnetic field of encoder 22.

Outer rotating ring 16 has an inner surface to which is mounted on encoder support 23 for encoder 22. The encoder fits in the radial portion 24 and axial portion 25 of encoder support 23. Encoder support 23 also holds a seal 26, the axial and radial lips 27, 27, of which are in contact with the walls 18 and 19 of support 17. Encoder 22 can advantageously be made of the same material as the seal such as rubber, or polyurethane and cast with said seal onto encoder support 23. However, the encoder will in this case contain a magnetizable substance, such as ferrite powder.

Figure 3:
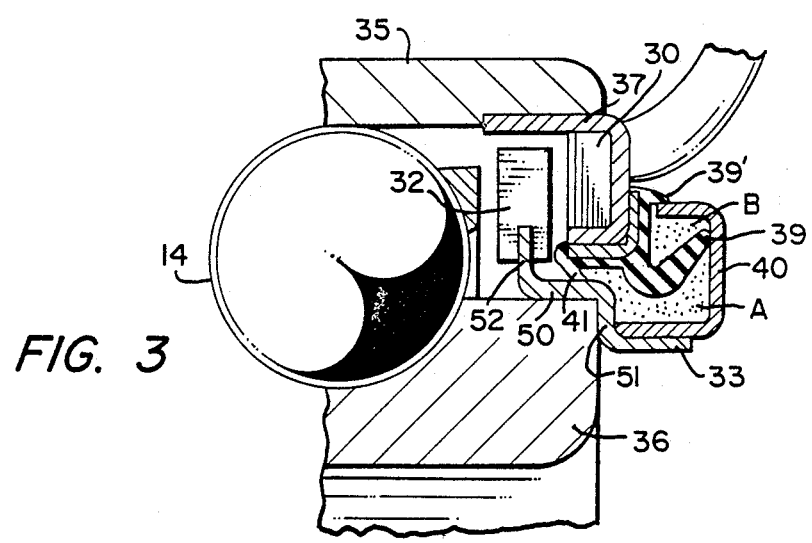
FIG. 3 is an enlarged view in cross section of a further embodiment of the invention.

The bearing shown in FIG. 3 has a fixed outer ring 35, on which is mounted sensor 30, and a rotating inner ring 36, to which the encoder 32 is attached. Encoder 32 is attached to the radially extending portion 52 of an encoder support by any known means such as bonding, casting, and welding. The outer surface and an end surface of inner ring 36 support the axial portion 50 and radial portion 51 of the encoder support.

Sensor 30 is mounted on ring 35 by means of a sensor support 37, mounted on the inside surface of ring 35.

The axial distance between sensor 30 and encoder 32 can thus be obtained with sufficient precision to make any subsequent adjustment unnecessary.

A seal is fixedly attached to sensor support 37. The seal has an axial lip 39 and radial lip 39, which rests on a mounting element 40, which fits into the axially extending portion 33 of the encoder support. Mounting element 40 rotates.

Another radial lip 41 rests on the encoder support portion and holds a primary lubricant reserve A, which is itself isolated from a second reserve B by axial lip 39. Reserves A and B, located between lips 41, 39, and 39, 39,, respectively, provide a double seal and ensure the lubrication of all lips 39, 39', and 41.

I claim:

1. A bearing comprising: a fixed ring; a rotating ring spaced from the fixed ring; rolling elements in contact with said rings; a sensor support mounted on the fixed ring; a sensor mounted on the sensor support; an encoder support mounted on the rotating ring; an encoder mounted on the encoder support, the encoder being a magnetic field source, the sensor having at least a portion thereof directly facing the encoder; means for providing a lubricant reserve, and having a radially extending portion and an axially extending portion; and a seal mounted on one of said supports said seal having at least two lips, one lip sealingly engaging the radially extending portion of the lubricant reserve; the other lip sealingly engaging the axially extending portion of the lubricant reserve.

2. A bearing in accordance with claim 1, wherein the seal is mounted on the encoder support.

3. A bearing in accordance with claim 2, wherein the sensor support includes an axial opening through which the at least a portion of the sensor facing the encoder extends.

4. A bearing in accordance with claim 1, wherein the seal is mounted on the sensor support.

5. A bearing comprising: a fixed ring; a rotating ring radially outwardly spaced from the fixed ring; rolling elements in contact with said rings; an encoder support mounted on an inside diameter surface of the rotating ring, the encoder support having a first radially extending portion, an integral axially inwardly extending portion and an integral second radially extending portion; an encoder positioned in the encoder support axially inwardly extending portion and the encoder support second radially extending portion, the encoder being a magnetic field service; a seal attached to the encoder support first radially extending portion, the seal having at least two sealing lips; a sensor support mounted on an outside diameter surface of the fixed ring, the sensor support having a radially extending portion and an axially extending portion, said sensor support having an axial opening directly facing the encoder; and a sensor attached to the outside surfaces of the sensor support radially extending portion and the sensor support axially extending portion with a portion of the sensor located in said sensor support axial opening, one of the seal sealing lips contacting the inside surface of the sensor support radially extending portion, and the other seal sealing lip contacting the sensor support axially extending portion to provide a lubricant reserve.

6. A bearing comprising: a fixed ring; a rotating ring radially inwardly spaced from the fixed ring; rolling elements in contact with said rings; a sensor support mounted on an inside diameter surface of the fixed ring, the sensor support having a first axially extending portion, an integral radially extending portion and a second axially extending portion radially inwardly spaced from the first axially extending portion; a sensor mounted on the sensor support, the sensor having surfaces in contact with the inside surfaces of said two sensor support axially extending portions and the inside surface of said sensor support radially extending surface, the sensor having an axially inwardly facing exposed surface; a seal attached to the sensor support, the seal having three sealing lips; an encoder support having a first radially extending portion extending radially outwardly from an outside diameter surface of the rotating second axially extending portion, and a second axially extending portion having its free end spaced from the sensor support radially extending portion, said lubricant reserve member axially extending portions being interconnected by an integral radially extending portion, one seal lip being in sealing contact with the encoder support first axially extending portion, another seal lip being in sealing contact with the lubricant reserve member radially extending portion and another seal lip extending from inside the lubricant reserve member through the space separating the ring, an integral first axially extending portion extending along said outside diameter surface to an end surface of the rotating ring, an integral second radially extending portion radially extending along said end surface, and an integral second axially extending portion extending axially outwardly from said end surface; an encoder providing a magnetic field attached to the first radially extending portion of the encoder support and facing the sensor exposed surface; and a lubricant reserve member having a first axially extending portion fitting into the encoder support sensor support radially extending portion from the lubricant reserve member second axially extending portion and in sealing contact with the outside surface of said second axially extending portion.

* * * * *